United States Patent

Kubota et al.

[11] Patent Number: 5,237,031
[45] Date of Patent: Aug. 17, 1993

[54] ORGANIC SOLID ELECTROLYTE

[75] Inventors: Tadahiko Kubota; Shoichiro Yasunami, both of Kanagawa, Japan

[73] Assignee: Fuji Photo Film Co., Ltd., Kanagawa, Japan

[21] Appl. No.: 652,759

[22] Filed: Feb. 8, 1991

[30] Foreign Application Priority Data

Feb. 9, 1990 [JP] Japan .................................. 2-30318
Mar. 27, 1990 [JP] Japan .................................. 2-78531

[51] Int. Cl.$^5$ ................ C08F 120/54; H01M 6/16; H01M 6/18
[52] U.S. Cl. .................... 526/305; 252/62.2; 429/192; 429/198; 429/213; 429/218; 526/173; 526/303.1; 526/310; 526/312; 526/319; 526/326; 526/328.5
[58] Field of Search ............. 429/192; 526/305, 173, 526/312, 326; 252/62.2

[56] References Cited

U.S. PATENT DOCUMENTS

| | | | |
|---|---|---|---|
| 4,654,279 | 3/1987 | Bauer | 429/192 |
| 4,822,701 | 4/1989 | Ballard | 429/192 |
| 4,830,939 | 5/1989 | Lee | 429/192 |

Primary Examiner—Joseph L. Schofer
Assistant Examiner—Fred Zitomer
Attorney, Agent, or Firm—Sughrue, Mion, Zinn, Macpeak & Seas

[57] ABSTRACT

An organic solid electrolyte is disclosed, which comprises a high molecular compound having a recurring unit represented by following formula (I), a nonprotonic polar solvent, and a salt of a metal ion belonging to group Ia or group IIa of the Periodic Table:

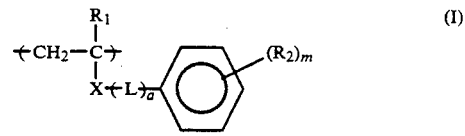

wherein $R_1$ represents a hydrogen atom, a lower alkyl group, a cyano group, or a chlorine atom; $R_2$ represents a lower alkyl group, an alkenyl group, an aryl group, or an aralkyl group; X represents $-CO_2-$,

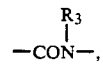

$-OCO-$, or $-O-$, (wherein $R_3$ represents a hydrogen atom or a lower alkyl group); L represents an alkylene group; a represents 0 or 1; and m represents an integer of from 0 to 5.

8 Claims, 3 Drawing Sheets

… (the term "JP-A" as used herein refers to a "published unexamined Japanese patent application"), but these materials also have

ORGANIC SOLID ELECTROLYTE

FIELD OF THE INVENTION

This invention relates to an organic solid electrolyte, and more particularly to an organic solid electrolyte suitable for antistatic materials, galvanic cells, and as materials for other electrochemical devices.

BACKGROUND OF THE INVENTION

For applying a solid electrolyte to electrochemical devices such as antistatic materials, (galvanic) cells, etc., it is necessary that the solid electrolyte not only has a good ionic conductivity but also is excellent in film forming property, has good storage stability, and can be easily produced. However, a solid electrolyte satisfying all these necessary requirements has not yet been developed.

For example, it is known that the inorganic solid electrolytes shown by Na—$\beta$—$Al_2O_3$ and $Na_{1+x}Zr_2P_{3-x}Si_xO_{12}$ ($0 \leq X \leq 3$) have a good ion conductivity as described in M.S. Whittingham, *Journal of Chemical Physics*, Vol. 54, 414 (1971) and A. Clearfield, et al., *Solid State Ionics*, Vol. 9/10, 895 (1983) but these inorganic solid electrolytes have fatal faults that they have a very weak mechanical strength and are inferior in fabricability into a flexible film.

It is reported the polyethylene oxide (hereinafter, is referred to as PEO) forms a complex functioning as a solid electrolyte with a salt of a metal ion belonging to group Ia or group IIa of the Periodic Table, such as $LiCF_3SO_3$, $LiI$, $LiClO_4$, $NaI$, $NaCF_3SO_3$, $KCF_3SO_3$, etc., and these complexes have a relatively good ion conductivity in P. Vashista et al., *Fast Ion Transport in Solid*, 131 (1979) and also these complexes have a viscoelasticity and flexibility specific to a polymer, a good workability, and also good storage stability. However, since PEO has a large temperature reliance, although the aforesaid complex may show a good ionic conductivity at a temperature of 60° C. or higher, the ionic conductivity thereof is greatly deteriorated at about room temperature and hence it is difficult to use the aforesaid complexes for products which can be used in a wide temperature range.

Thus, for solving the faults of PEO, various PEO-modified polymers have been proposed. For example, there are a vinylic polymer having a PEO group at the side chain described in D.J. Banister et al., *Polymer*, Vol. 25, 1600 (1984), a polyphosphagen having a PEO group at the side chain described in D. F. Shriver et al., *Journal of American Chemical Society*, Vol. 106, 6854 (1984), and a material formed by introducing a low molecular weight PEO group into a part of polysiloxane described in Watanabe et al., *Journal of Power Sources*, Vol. 20, 327 (1987), etc.

However, these PEO-modified polymers have a low ion conductivity and cannot be practically used.

Thus, for improving the ionic conductivity of polymers at room temperature, materials composed of gels of high molecular compounds carrying an ionic conductor have been recently actively investigated.

For example, JP-B-57-9671 (the term "JP-B" as used herein refers to an "examined Japanese patent publication") discloses a material formed by dissolving polymethyl methacrylate (herein after, is referred to as PMMA) in propylene carbonate (hereinafter, is referred to as PC) and then gelling the solution by heating. However, in order to increasing the ionic conductivity of the aforesaid material to a practically usable level, it is required to use a large amount of PC, which results in greatly reducing the film strength of the material, whereby the material cannot function as a solid electrolyte.

Also, materials using acrylate or methacrylate polymers having various functional groups as a gelling agent for a nonaqueous solvent are disclosed in JP-A-62-20262, JP-A-62-20263, JP-A-62-22375, JP-A-62-22376, JP-A-62-219468, and JP-A-62-219469 (the term "JP-A" as used herein refers to a "published unexamined Japanese patent application"), but these materials also have the aforesaid problems and materials having both a high ionic conductivity and an excellent film forming property have not yet been developed.

Also, JP-A-63-135477 shows a material composed of a crosslinked high molecular matrix having a PEO group carrying a low molecular weight liquid PEO but the ionic conductivity of the material cannot be over a low value of about $10^{-4}$ s/cm, which is the ionic conductivity of a liquid PEO and the material is unsuitable for use as practical devices.

Furthermore, materials obtained by impregnating a high molecular matrix having a polar group at the side chain with a nonprotonic polar solvent such as PC are disclosed in U.S. Pat. Nos. 4,822,701 and 4,830,939 but in these materials, a large amount of the solvent is required for increasing the ionic conductivity, thereby the problem of greatly reducing the film forming property cannot be solved, and hence the material is also unsuitable for practical use.

Also, for the viewpoint of improving the film forming property, materials obtained by impregnating porous films such as nonwoven fabrics with a high molecule electrolyte are described in JP-A-63-40270 and JP-A-63-102104 but since the ionic conductivity of these materials depends upon the high molecule electrolyte itself, the materials have a fatal fault that the ionic conductivity is very low. Furthermore, a material composed of a porous film having small pore sizes carrying therein an ionic conductor is disclosed in U.S. Pat. No. 4,849,311 but for carrying a liquid ionic conductor, it is necessary to considerably reduce the pore sizes, whereby the interfacial resistance thereof with an electrode material, etc., is greatly increased and hence the material is also unsuitable for practical use.

As described above, conventionally known solid electrolytes cannot meet the whole problems that the ionic conductivity at about room temperature is very low and the film forming property is very inferior or the interfacial resistance with an electrode material, etc., is very large and hence the provision of a solid electrolyte solving the whole problems has been desired.

SUMMARY OF THE INVENTION

The object of this invention is, therefore, to provide a novel organic solid electrolyte showing a high ionic conductivity even at a temperature of near room temperature, having an excellent film forming property, showing less interfacial resistance with an electrode material, etc., and having an excellent liquid leakage resistance.

As the results of various investigations for solving the aforesaid problems in conventional solid electrolytes, the inventors have discovered that the aforesaid object can be achieved by the present invention as set forth hereinbelow.

That is, according to this invention, there is provided an organic solid electrolyte comprising a high molecular compound having a recurring unit represented by the following formula (I), a nonprotonic polar solvent, and a salt of a metal ion belonging to group Ia or group IIa of the Periodic Table:

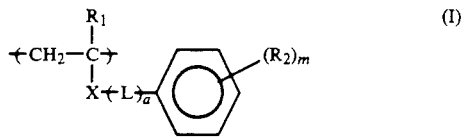  (I)

wherein $R_1$ represents a hydrogen atom, a lower alkyl group, a cyano group, or a chlorine atom; $R_2$ represents an alkyl group (including methyl, ethyl, propyl, and butyl), an alkenyl group, an aryl group, or an aralkyl group;

X represents $-CO_2-$,

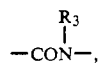

$-OCO-$, or $-O-$, (wherein $R_3$ represents a hydrogen atom or an alkyl group (including methyl, ethyl, propyl and butyl); L represents an alkylene group; a represents 0 or 1; and m represents an integer of from 0 to 5.

According to one embodiment of this invention, the organic solid electrolyte described above is in a thin film form.

According to another embodiment of this invention, there is further provided an organic solid electrolyte comprising a high molecular matrix composed of a monomer represented by the following formula (II) and a monomer represented by the following formula (III), a nonprotonic polar solvent, and a salt of a metal ion belonging to group Ia or group IIa of the Periodic Table:

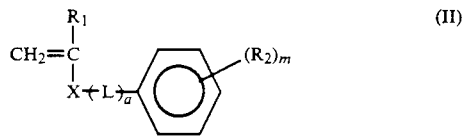  (II)

wherein $R_1$ represents a hydrogen atom, a lower alkyl group, or a chlorine atom; $R_2$ represents an alkyl group (including methyl, ethyl, propyl, and butyl), an alkenyl group, an aryl group, or an aralkyl group; X represents $-CO_2-$,

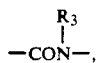

$-OCO-$, or $-O-$ (wherein $R_3$ represents a hydrogen atom or an alkyl group (including methyl, ethyl, propyl, and butyl)); L represents an alkylene group; a represents 0 or 1; and m represents an integer of from 0 to 5;

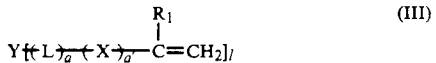  (III)

wherein Y represents an l-valent atomic group composed of carbon or carbon and hydrogen; a, represents 0 or 1; l represents an integer of 2 or more; and $R_1$, L, X, and a are same as in formula (II).

According to other embodiment of this invention, the organic solid electrolyte in the aforesaid embodiment is in a thin film form.

In the case that the organic solid electrolyte of this invention is in a thin film form, the thin film is formed by heating.

Also, in the case that the organic solid electrolyte of this invention is in a thin film form, the thin film is formed by filling the organic solid electrolyte into a porous film having a mean pore size of at least 0.15 μm.

In the aforesaid case of this invention, the porous film is composed of polyolefin.

DETAILED DESCRIPTION OF THE INVENTION

Figure 1:
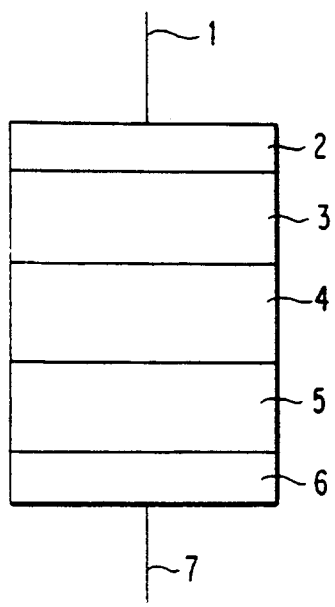
FIG. 1 is a schematic sectional view showing an example of the galvanic cell prepared in Example 7.

Then, the present invention is described in detail.

The organic solid electrolyte of this invention in the first embodiment comprises a nonionic conductive high molecular compound, a high ionic conductive non-protonic polar solvent, and a salt of a metal ion and the feature of this invention is in the point of using the high molecular compound having a phenyl group at the side chain, whereby even when the organic solid electrolyte is impregnated with a large amount of a nonprotonic polar solvent until the ionic conductivity becomes a practical level, the film forming property is not astonishingly reduced and the electrolyte shows a good film quality.

When a crosslinking agent is not used for the organic solid electrolyte of this invention, the organic solid electrolyte is formed into a thin film by dissolving the monomer and the salt of a metal ion in the non-protonic polar solvent and heating the solution. Also, when a crosslinking agent is used, after dissolving the monomer and the salt of a metal ion in the nonprotonic polar solvent, a crosslinked high molecular matrix is formed by heating the solution or a crosslinked high molecular matrix previously formed is impregnated with the nonprotonic polar solvent and the salt of a metal ion.

In other embodiment of this invention, the organic solid electrolyte of this invention is composed of a porous film having a mean pore size of at least 0.15 μm filled with the high molecular compound, the high ionic conductive nonprotonic polar solvent, and the salt of a metal ion. It has been discovered that by using a porous film having a mean pore size of at least 0.15 μm, the interfacial resistance with an electrode material, etc., is saturated at almost a definite value. Also, the porous film is filled with the aforesaid components using a high molecular compound having a phenyl group at the side chain as the high molecular compound, even when the porous film is impregnated with the nonprotonic polar solvent in such a large amount that the ionic conductivity becomes a practical level, the porous film shows a good film quality without reducing the film forming property of the high molecular compound.

When a crosslinking agent is not used as a high molecular compound, the organic solid electrolyte is formed into a solid thin film by dissolving the monomers and the salt of a metal ion in the nonprotonic polar solvent, impregnating the porous film with the solution, and then heating the porous film. Also, when a crosslinking agent is used as a high molecular compound, a thin film of a crosslinked high molecular matrix is formed by dissolving the monomers and the salt of a metal ion in the nonprotonic polar solvent, impregnating the porous film with the solution, and then heating the porous film, or a crosslinked high molecular matrix is previously formed in the porous film and then the porous film is impregnated with the nonprotonic polar solvent and the salt of a metal ion.

As the porous film which is used in this invention, a film composed of a polyolefin is used and a film composed of polyethylene or polypropylene is preferably used. Also, the mean pore side (diameter) of the porous film is at least 0.15 μm but is preferably from 0.20 μm to 5.0 μm, and more preferably from 0.30 μm to 3.0 μm.

If the mean pore size is small, the interfacial resistance with an electrode material (Li, etc.) is reduced and as described above, if the mean pore size of the porous film is less than 0.15 μm, the reduction extent of the interfacial resistance is greatly increased. Also, if the mean pore size is too large, the film strength is undesirably reduced.

The porosity of the porous film is preferably from 10 to 90%, and more preferably from 20 to 70%. If the porosity is too small, the impregnated amount of the nonprotonic polar solvent becomes too small, the ionic conductivity is reduced and also if the porosity is too large, the film strength is reduced.

Furthermore, the film thickness is in the range of preferably from 5 to 500 μm, and more preferably from 10 to 400 μm. If the film thickness is too thick, the resistance becomes large and if the film thickness is too thin, the film strength is reduced.

Then, the aforesaid formulae (I) to (III) are described in detail.

In the aforesaid formulae, $R_1$ represents a hydrogen atom, a lower alkyl group, a cyano group, or a chlorine atom, preferably a hydrogen atom or an alkyl group having from 1 to 3 carbon atoms, and more preferably a hydrogen atom or a methyl group. $R_2$ represents an alkyl group (including methyl, ethyl, propyl, and butyl), an alkenyl group, an aryl group, or an aralkyl group, preferably an alkyl group having from 1 to 5 carbon atoms, an alkenyl group having from 2 to 6 carbon atoms, an aryl group having from 6 to 12 carbon atoms (e.g., a phenyl group), or an aralky group having from 6 to 10 carbon atoms, and more preferably an alkyl group having from 1 to 5 carbon atoms. When two or more $R_2$ exist, $R_2$s may condense with each other, and preferably condense to form an aromatic ring.

X represents —CO$_2$—,

—OCO—, or —O— (wherein $R_3$ represents a hydrogen atom or an alkyl group including methyl, ethyl, propyl, and butyl).

X preferably represents —CO$_2$—,

—OCO—, or —O— (wherein $R_3$ represents a hydrogen atom or an alkyl group having from 1 to 8 carbon atoms), and is more preferably —CO$_2$— or $$-\text{CON}-\overset{R_3}{\underset{|}{\phantom{N}}}$$

(wherein $R_3$ represents a hydrogen atom or methyl, ethyl, propyl, and butyl).

L represents an alkylene group, preferably an alkylene group having from 1 to 8 carbon atoms, and more preferably an alkylene group having from 1 to 5 carbon atoms.

In the above formulae, a represents 0 or 1 and m represents an integer of from 0 to 5.

Y represents an l-valent atomic group composed of carbons or carbon and hydrogen. When l is 2, Y represents a substituted or unsubstituted alkylene group, a substituted or unsubstituted arylene group, or a combination of these groups. When l is 2, preferred examples of Y are

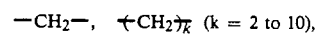

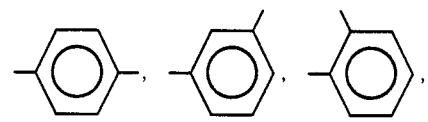

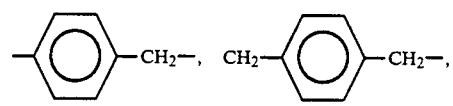

and

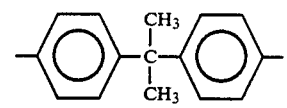

When l is 3, Y represents the following formula (IV):

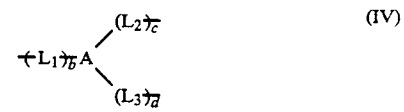
(IV)

wherein A represents substituted or unsubstituted

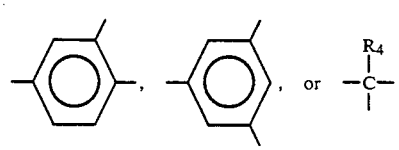

(wherein $R_4$ represents a hydrogen atom, a substituted or unsubstituted $C_{1-6}$ alkyl group, a substituted or unsubstituted $C_{2-6}$ alkenyl group, a substituted or unsubstituted $C_{6-12}$ aryl group, or a substituted or unsubstituted $C_{7-14}$ aralkyl group); $L_1$, $L_2$, and $L_3$, which may be the same or different, have the same meaning as those of Y when l is 2; and b, c, and d each independently represents 0 or 1.

Preferred examples of Y when l=3 are

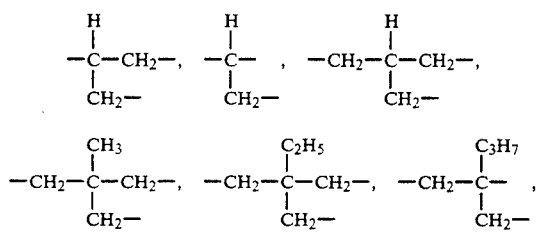

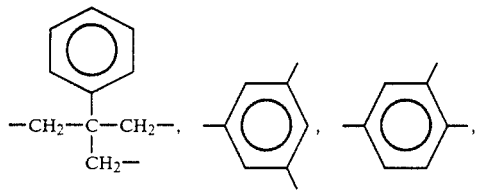

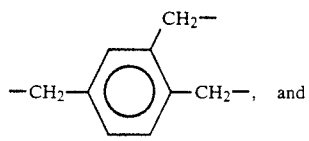

, and

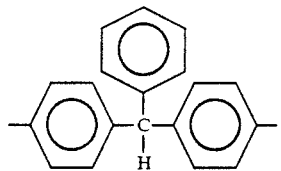

When l is 4, Y is represented by the following formula (V):

$$+L_4)_h B \begin{matrix} (L_5)_e \\ \\ (L_7)_g \end{matrix} (L_6)_f \quad (V)$$

wherein B represents

, substituted or unsubstituted

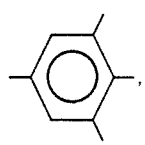

substituted or unsubstituted

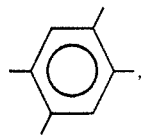

or substituted or unsubstituted

;

$L_4$, $L_5$, $L_6$ and $L_7$, which may be the same or different, have the same meaning as those of Y when l is 2; and e, f, g and h each independently represents 0 or 1.

Preferred examples of Y when l is 4 are

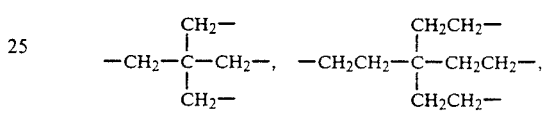

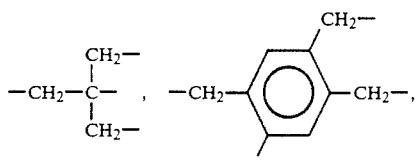

and

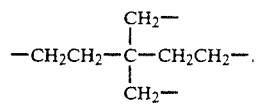

When a crosslinking agent is not used, the high molecular compound for use in this invention may contain a recurring unit induced from other monomer component in addition to the recurring unit shown by formula (I) but in this case, the recurring unit shown by formula (I) is contained in the high molecular compound in an amount of at least 50 mol %, preferably at least 70 mol %, and more preferably at least 80 mol %.

Also, in this case, the recurring unit shown by formula (I) may be used as plural units.

Then, specific examples of the high molecular compound having the recurring unit shown by formula (I) are illustrated below but the invention is not limited to the compounds.

P-1: Polybenzyl acrylate

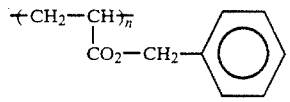

(n shows the polymerization degree, and so forth)

P-2: Polybenzyl methacrylate

-continued

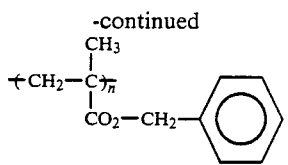

P-3: Polyphenethyl methacrylate

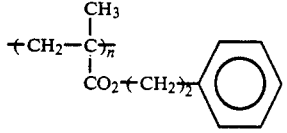

P-4: Poly-p-tolyl acrylate

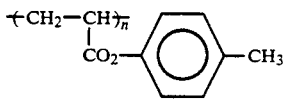

P-5: Poly-p-ethylbenzyl methacrylate

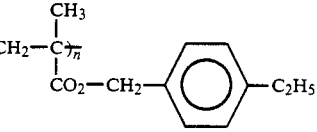

P-6: Poly-4-phenylbutyl methacrylate

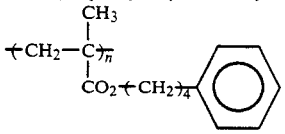

P-7: Poly-2,4-dimethylbenzyl acrylate

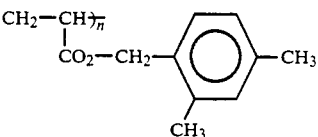

P-8: Polyphenethylacrylamide

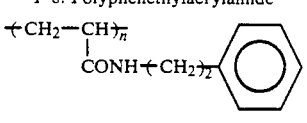

P-9: Poly-N-methyl-N-p-(2-phenylisopropyl)benzyl-methacrylamide

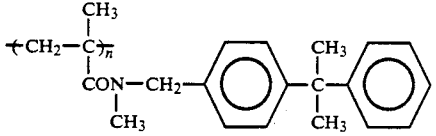

P-10: Polyphenyl methacrylate

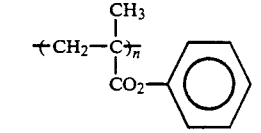

P-11: Poly-3-(p-tolylpropyl) methacrylate

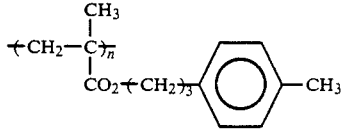

P-12:

-continued

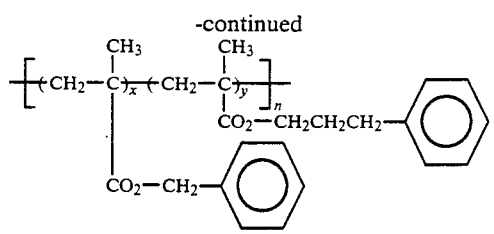

x = 80, y = 20
(x and y represent a copolymerization ratio, and so forth)

P-13:

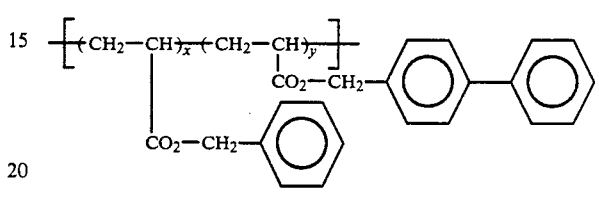

x = 70, y = 30

P-14: Polyvinyl benzoate

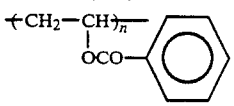

P-15: Poly-1-naphthyl acrylate

When a crosslinking agent is used, the high molecular matrix for use in this invention may be formed using other monomer component in addition to the monomer shown by formula (II) or formula (III). In this case, however, the recurring unit induced from the monomer shown by formula (II) is contained in the high molecular matrix in an amount of at least 50 mol %, preferably at least 60 mol %, and more preferably at least 70 mol %. Also, the recurring unit induced from the monomer shown by formula (III) is contained in the high molecular matrix in an amount of from 0.1 to 50 mol %, preferably from 0.2 to 40 mol %, and more preferably from 0.5 to 30 mol %. Also, these recurring units may exist in the high molecular matrix as plural units.

Then, specific examples of the monomer shown by formula (II) are illustrated below but the invention is not limited to these compounds.

M-1: Benzyl acrylate

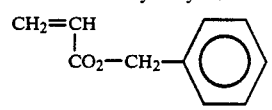

M-2: Benzyl methacrylate

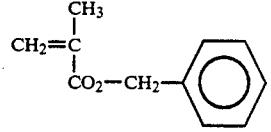

M-3: Phenethyl methacrylate

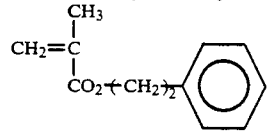

M-4: p-Tolyl acrylate

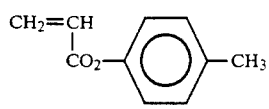

M-5: p-Ethylbenzyl methacrylate

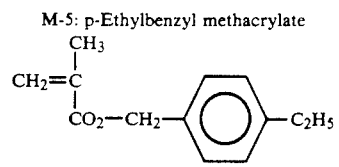

M-6: 4-Phenylbutyl methacrylate

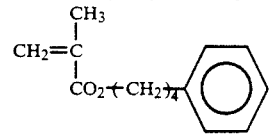

M-7: 2,4-Dimethylbenzyl acrylate

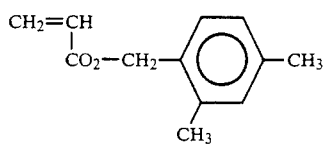

M-8: Phenethylacrylamide

M-9: N-Methyl-N-(p-2-phenylisopropyl)benzylmethacrylamide

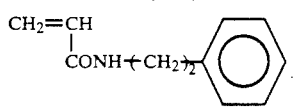

M-10: Phenyl methacrylate

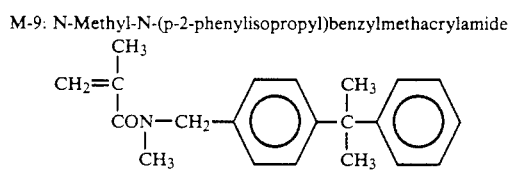

M-11: 3-(p-Tolyl)propyl methacrylate

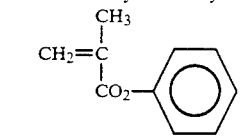

M-12: p-(2-Phenylisopropyl) benzyl acrylate

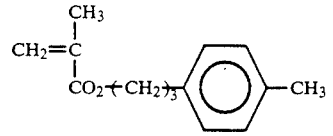

M-13: p-Isopropylbenzyl methacrylate

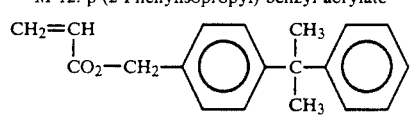

M-14: Vinyl benzoate

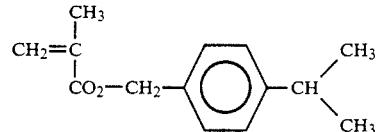

M-15: 1-Naphthyl methacrylate

Then, specific examples of the monomer represented by formula (III) are illustrated below but the invention is not limited to these compounds.

C-1: Ethylene glycol diacrylate

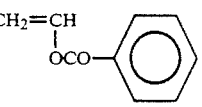

C-2: Butanediol dimethacrylate

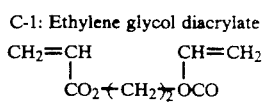

C-3: Hexamethylene glycol methanol

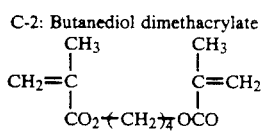

C-4: p-Divinylbenzene

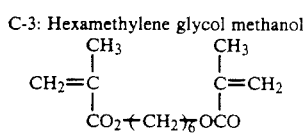

C-5: p-Xylene glycol dimethacrylate

C-6: 1,3-Butylene glycol diacrylate

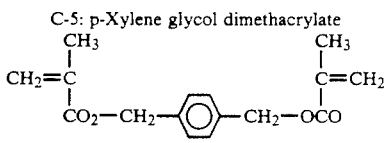

C-7: Neopentyl glycol dimethacrylate

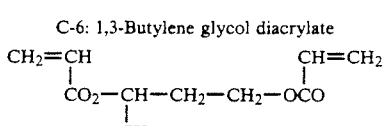

C-8: 2,2-Bis[4-(acryloxymethyl)phenyl]propane

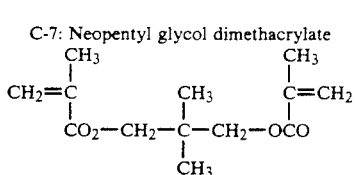

C-9: 2-Ethyl-1,3-propanediol dimethacrylate

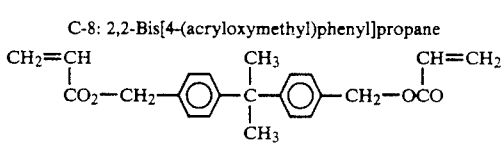

C-10: Trimethylolpropane triacrylate

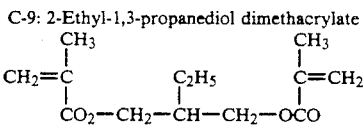

C-11: Trimethylolpropane trimethacrylate

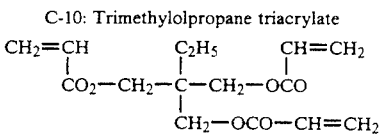

-continued

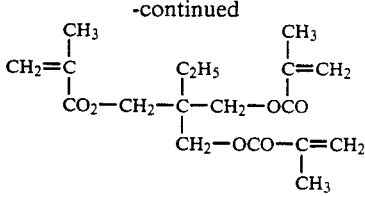

C-12: Tetramethylolmethane tetraacrylate

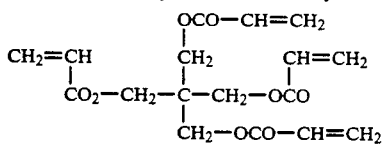

The high molecular compound or the crosslinked high molecular matrix for use in this invention can be formed by heating and/or by the irradiation of radiations but is preferably formed by heating corresponding monomer(s).

In the case of causing the reaction by heating, it is preferred for shortening the polymerization time to add from 0.01 to 5 mol % of a thermal polymerization initiator to the system.

As the thermal polymerization initiator for use in this invention, there are known thermal polymerization initiators such as azobis compounds, peroxides, hydroperoxides, redox catalysts, etc., and specific examples thereof are potassium persulfate, ammonium persulfate, t-butyl peroctoate, benzoyl peroxide, isopropyl percarbonate, 2,4-dichlorobenzoyl peroxide, methyl ethyl ketone peroxide, cumene hydroperoxide, azobisisobutyronitrile, and 2,2'-azobis(2-amidinopropane) hydrochloride.

The heating temperature is preferably from 40° to 160° C., and more preferably from 50° to 140° C.

Also, the reaction of forming the high molecular compound may be performed by the irradiation of radiation and as radiations which are used in this case, ultraviolet rays, visible light, electron rays, and X-rays are preferred.

In the case of causing the reaction by the irradiation of radiations, it is preferred for quickly carrying out the reaction to add a radiation sensitizer to the system. As the radiation sensitizer which can be used in this invention, there are known sensitizers such as carbonyl compounds, azobis compounds, peroxides, sulfur compounds, halogen compounds, oxidation reduction series compounds, cation polymerization initiators, benzophenone derivatives, benzanthrone derivatives, quinones, aromatic nitro compounds, naphthothiazoline derivatives, benzothiazoline derivatives, thioxanthones, naphthothiazole derivatives, ketocoumarin compounds, benzothiazole derivatives, naphthofuranone compounds, pyrylium salts, thiapyrylium salts, etc. Specific examples thereof are N,N'-diethylaminobenzophenone, 1,2-benzanthraquinone, benzanthrone, (3-methyl-1,3-diaza-1,9-benz)anthrone, picramide, 5-nitroacenaphthene, 2,6-dichloro-4-nitroaniline, p-nitroaniline, 2-chlorothioxanthone, 2-isopropylthioxanthone, dimethylthioxanthone, methylthioxanthone-1-ethyl carboxylate, 2-nitrofluorene, 2-dibenzoylmethylene-3-methylnaphthothiazoline, 3,3-carbonyl-bis(7-diethylaminocoumarin), 2,4,6-triphenylthiapyrylium perchlorate, 2-(p-chlorobenzoyl)naphthothiazole, erythrosine, Rose Bengale, Eosine G, benzoin, 2-methylbenzoine, trimethylsolylbenzoin-4-methoxybenzophenone, Michler's ketone, benzoin methyl ether, acetophenone, and anthraquinone.

As a metal ion belonging to group Ia or group IIa of the Periodic Table, which is used in this invention, there are ions of lithium, sodium, and potassium and specific examples of the salt of the metal ion are LiCF$_3$SO$_3$, LiI, LiPF$_6$, LiClO$_4$, LiBF$_4$, LiAsF$_6$, LiCF$_3$CO$_2$, LiSCN, NaClO$_4$, NaI, NaCFP$_3$SO$_3$, NaBF$_4$, NaAsF$_6$, KCF$_3$SO$_3$, KSCN, KPF$_6$, KClO$_4$, and KAsF$_6$. In the aforesaid salts, the Li salts are preferred and they can be used singly or as a mixture of them.

The content of the salt of the metal ion to the nonprotonic solvent for use in this invention may be less than the solubility thereof but is preferably from about 0.1 to 8 mol/liter, and more preferably from 0.3 to 6 mol/liter. Also, the metal salt may be used as a mixture with other electrolyte such as NBu$_4$FB$_4$, etc.

As the nonprotonic polar solvent for use in this invention, it is preferable to use at least one kind of solvent belonging to carbonates, lactones, ethers (including cyclic ones), glycols, nitriles, esters, and amides.

Preferred examples of carbonates are ethylene carbonate, propylene carbonate, vinylene carbonate, ethyl carbonate, propyl carbonate, 4,5-dimethyl-1,3-dioxolan-2-one, 4-methoxymethyl-1,3-dioxolan-2-one, and 4,5-dimethoxymethyl-1,3-dioxolan-2-one.

Preferred examples of the lactones are γ-butyrolactone, γ-valerolactone, γ-caprylolactone, crotolactone, γ-caprolactone, δ-valerolactone,

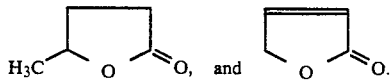

Preferred examples of ethers are cyclic ethers such as tetrahydrofuran, 2-methyltetrahydrofuran, 3-methyltetrahydrofuran, 2,5-dimethyltetrahydrofuran, tetrahydropyran, 2-methyltetrahydropyran, 3-methyltetrahydropyran, dioxolan, 2-methyldioxolan, 4-methyldioxolan, 1,3-dioxane, 1,4-dioxane, 2-methyl-1,4-dioxane, etc., and chain ethers such as diethyl ether, dipropyl ether, ethyl propyl ether, 1,2-dimethoxyethane, etc.

Preferred examples of glycols are diethylene glycol, dimethyl ether, triethylene glycol dimethyl ether, and tetraethylene glycol dimethyl ether.

Preferred examples of nitriles are acetonitrile and propionitrile.

Preferred examples of esters are methyl formate and ethyl formate.

Preferred examples of amides are N,N-dimethylformamide and N,N-dimethylacetamide.

Furthermore, nitromethane, thionyl chloride, sulforan, etc., can be preferably used as the nonprotonic polar solvent.

The aforesaid non-protonic polar solvents can be used singly or as a mixture thereof.

The high molecular compound or the crosslinked high molecular matrix is impregnated with the aforesaid nonprotonic polar solvent in an amount of preferably from 0.2 to 10 times (by weight), and more preferably from 0.5 to 5 times the amount of the compound or the matrix. If the impregnated amount of the solvent is too small, the ionic conductivity becomes too low and if the impregnated amount is too large, the problem of liquid leakage happens.

When a crosslinking agent is not used in this invention, the organic solid electrolyte of this invention is prepared by incorporating the nonprotonic polar solvent and the salt of the metal ion in the high molecular compound or the matrix at the polymerization thereof. Also, when a crosslinking agent is used, the nonprotonic polar solvent and the salt of the metal ion may be incorporated in a crosslinked high molecular matrix at the formation thereof or after the formation thereof.

When the aforesaid components are incorporated in the crosslinked high molecular matrix after the formation of the crosslinked high molecular matrix, it is preferred that the high molecular matrix is impregnated with the nonprotonic polar solution containing the salt of the metal ion or the nonprotonic polar solution containing the salt of the metal ion is sprayed onto or coated on the crosslinked high molecular matrix to incorporate the solution therein.

Also, in this case, before incorporating the solution in the crosslinked high molecular matrix, the high molecular matrix may be washed using the nonprotonic polar solvent and as the washing method, the high molecular matrix may be immersed in the solvent or a Soxhlet's washing method may be employed.

Also, the organic solid electrolyte of this invention is used for a secondary battery, as the positive electrode active material, oxides, sulfides, and selenides of manganese, molybdenum, vanadium, titanium, chromium, niobium, etc., active carbon (described in JP-A-60-167280), carbon fibers (described in JP-A-61-10882), polyaniline, amino-substituted aromatic polymers, heterocyclic polymers, polyacene, polyimine compounds, etc., can be used. In these materials, active carbon, $\gamma$-$MnO_2$ (described in JP-A-62-108455 and JP-A-62-108457), a mixture of $\gamma$-$\beta$-$MnO_2$ and Li (described in U.S. Pat. No. 4,758,484), amorphous $V_2O_5$ (described in JP-A-61-200667), $V_6O_{13}$, $MoS_2$ (described in JP-A-61-64083), $TiS_2$ (described in JP-A-62-222578), polyanilines (described in JP-A-60-65031, JP-A-60-149628, JP-A-61-281128, JP-A-61-258831, JP-A-62-90878, JP-A-62-93868, JP-A-62-119231, JP-A-62-181334, and JP-A-63-46223), polypyrrole (described in West German Patents 3,307,954A1, 3,318,857, 3,338,904, 3,420,854A1, and 3,609,137A1, JP-A-60-152690, JP-A-62-72717, JP-A-62-93863, and JP-A-62-143373), polyacene, polyacetylene (described in JP-A-57-121168, JP-A-57-123659, JP-A-58-40781, JP-A-60-124370, JP-A-60-127669, and JP-A-61-285678), and polyphenylene are particularly effective.

The electrode active material can usually contain an electrically conductive material such as carbon, silver (described in JP-A-63-148554), polyphenylene derivative (described in JP-A-59-20971), etc., and a cementing material such as teflon, etc.

As a negative electrode active material, metal lithium, polyacetine, polyacetylene, polyphenylene, lithium alloys with aluminum or magnesium (described in JP-A-57-65670 and JP-A-57-98977), mercury alloys (described in JP-A-58-111265), alloys with Pt, etc., (described in JP-A-60-79670), Sn-Ni alloys (described in JP-A-6-86759), Wood's alloy (described in JP-A-60-167279), alloys with conductive polymer (described in JP-A-60-262351), Pd-Cd-Bi alloys (described in JP-A-61-29069), Ga-In alloys (described in JP-A-61-66368), Pb-Mg alloys (described in JP-A-61-66370), alloys with Zn, etc., (described in JP-A-61-68864), Al-Ag alloys, etc., (described in JP-A-61-74258), Cd-Sn alloys, etc., (described in JP-A-61-91864), Al-Ni alloys, etc., (described in JP-A-62-119865 and JP-A-62-119866), Al-Mn alloys, etc., (described in U.S. Pat. No. 4,820,599), etc., can be used. In these materials, lithium metal or the Al alloys of lithium are effectively used.

Then, the invention is described more practically by the following examples but the invention is not limited to them.

EXAMPLE 1

Case of not using crosslinking agent

In 3 g of propylene carbonate (PC) were dissolved 1 g of benzyl methacrylate and 0.4 g of $LiBF_4$ and then 10 mg of 2,2'-azobis(methylisobutylate) was uniformly dissolved in the solution. The solution was poured in a Teflon plate and polymerized by heating to 100° C. for one hour in an argon gas atmosphere to provide thin film (1) shown in Table 1 below.

By following the same procedure as above except that the components shown in Table 1 were used in place of the aforesaid components, thin films (2) to (12) shown in the same table were prepared.

COMPARATIVE EXAMPLE 1

Each of thin films (a) and (b) composed of PMMA, PC, and Li salts described in JP-B-57-9671 was prepared by the manner of heating the PC solution of PMMA.

COMPARATIVE EXAMPLE 2

Each of thin films (c) and (d) composed of poly(1-vinyl-1,2-propanediol cyclic carbonate) (E-1) having a mean molecular weight of 10,000, PC and Li salts described in JP-A-62-22375 was prepared by the manner of heating the PC solution of the aforesaid polymer.

Using each of the thin films thus obtained, a sample composed of Li/thin film/Li was prepared, the impedance thereof was measured at 0.1 to 10 KHz, and from the Cole-Cole's plots, the ionic conductivity was determined.

In addition, the film strength was measured by the following method.

Each thin film was cut into a disk having a diameter of 1.7 cm, the disk was placed on a stainless steel plate, a stainless steel plate having the same diameter as that of the disk was placed on the disk, a weight was applied to them from above, and the weight at which the thin film was clearly protruded was employed as the film strength.

The evaluation results are shown in Table 1 below.

TABLE 1

| No. | Polymer x of Formula (I) | Metal Ion Salt/Nonprotonic Polar Solvent (concentration M) | Nonprotonic Polar Solvent/Polymer (weight ratio) | Ion Conductivity (s/cm) | Film Strength (kg/cm²) |
|---|---|---|---|---|---|
| (1) | P-2 | $LiBF_4$/PC (1.3 M) | 2.5 | $8.5 \times 10^{-4}$ | 75 |
| (2) | P-2 | $LiClO_4$/$\gamma$-BL (2M) | 2.0 | $7.0 \times 10^{-4}$ | 80 |
| (3) | P-1 | $LiBF_4$/PC + EC*[1] (1/1) (2 M) | 1.4 | $5.1 \times 10^{-4}$ | >100 |
| (4) | P-3 | $LiCF_3SO_3$/DEDM*[2] (1 M) | 2.2 | $3.8 \times 10^{-4}$ | 85 |
| (5) | P-5 | $LiPF_6$/PC + EC (2M) | 1.3 | $7.2 \times 10^{-4}$ | >100 |
| (6)*[3] | P-7 | $LiBF_4$/PC (1.5 M) | 2.0 | $7.9 \times 10^{-4}$ | 45 |

TABLE 1-continued

| No. | Polymer x of Formula (I) | Metal Ion Salt/Non-protonic Polar Solvent (concentration M) | Nonprotonic Polar Solvent/Polymer (weight ratio) | Ion Conductivity (s/cm) | Film Strength (kg/cm$^2$) |
|---|---|---|---|---|---|
| (7) | P-5 | LiCF$_3$SO$_3$/γ-BL (1.2 M) | 1.8 | $6.5 \times 10^{-4}$ | 70 |
| (8) | P-12 | LiCF$_3$SO$_3$/PC + EC (3 M) | 2.0 | $1.5 \times 10^{-3}$ | 55 |
| (9) | P-13 | LiBF$_4$/PC + γ-BL (1.5 M) | 2.1 | $8.0 \times 10^{-4}$ | >100 |
| (10) | P-4 | LiClO$_4$/PC + EC (1.5 M) | 1.2 | $4.4 \times 10^{-4}$ | " |
| (11) | P-6 | LiBF$_4$/PC + DEDM (1 M) | 1.8 | $9.5 \times 10^{-4}$ | " |
| (12)*$^3$ | P-10 | LiBF$_4$/PC (1.5 M) | 2.0 | $7.1 \times 10^{-4}$ | 55 |
| (a) | PMMA | LiClO$_4$/PC (1 M) | 2.5 | $7.0 \times 10^{-4}$ | <10 |
| (b) | " | LiBF$_4$/butyl acetate (1 M) | 0.8 | $6.7 \times 10^{-5}$ | 30 |
| (c) | (E-1) | LiBPh$_4$/PC (1.5 M) | 2.0 | $5.1 \times 10^{-4}$ | <10 |
| (d) | " | " | 1.0 | $1.1 \times 10^{-4}$ | 20 |

In Table 1:
*$^1$Ethylene carbonate
*$^2$Diethylene glycol dimethyl ether
*$^3$Polymerized without using a polymerization initiator As is clear from the results shown in Table 1, it can be seen that thin films (1) to (12) in the examples of this invention are excellent in the ionic conductivity and/or the film strength as compared to thin films (a) to (d) in the comparative examples.

EXAMPLE 2

Case of using crosslinking agent

In 3 g of propylene carbonate (PC) were dissolved 0.9 g of Monomer M-2, 0.1 g of Monomer C-2, and 0.4 g of LiBF$_4$ and then 10 mg of benzoyl peroxide was uniformly dissolved in the solution.

The solution was poured in a Teflon plate and polymerized by heating to 120° C. for one hour under an argon gas atmosphere to provide thin film (13) shown in Table 2.

By following the aforesaid method of incorporating each nonprotonic polar solvent and each Li salt into each matrix at the reaction by heating using the components shown in Table 2, thin films (14) to (24) were obtained.

COMPARATIVE EXAMPLE 3

Thin films (e) and (f) composed of Polymer (E-2) shown below, PC, and Li salts described in U.S. Pat. No. 4,822,701 were prepared.

Polymer (E-2):

-continued $$-(CH_2-C)_{80}(CH_2-C)_{20}- \quad -(C-CH_2)_{20}-$$

with CH$_3$ groups and CO$_2$(CH$_2$CH$_2$—O)$_{15}$CH$_3$ and CO$_2$(CH$_2$CH$_2$—O)$_{15}$CO substituents On each of the thin films thus obtained, the ionic conductivity and the film strength were evaluated by the same manners as in Example 1.

The results obtained are shown in Table 2.

TABLE 2

| No. | Monomer x of Formula (II) | Monomer y of Formula (III) | x/y (weight ratio) | Metal Ion Salt/Non-protonic Polar Solvent (concentration M) | Nonprotonic Polar Solvent/Polymer (weight ratio) | Ionic Conductivity (s/cm) | Film Strength (kg/cm$^2$) |
|---|---|---|---|---|---|---|---|
| (13) | M-2 | C-2 | 90/10 | LiBF$_4$/PC (1.3 M) | 2.3 | $7.5 \times 10^{-4}$ | 95 |
| (14) | M-2 | C-5 | 95/5 | LiClO$_4$/γ-BL (2 M) | 2.0 | $6.9 \times 10^{-4}$ | 80 |
| (15) | M-1 | C-1 | 85/15 | LiBF$_4$/PC + EC (1/1) (2 M) | 2.0 | $8.1 \times 10^{-4}$ | >100 |
| (16) | M-3 | C-8 | 90/10 | LiCF$_3$SO$_3$/DEDM (1 M) | 2.2 | $4.2 \times 10^{-4}$ | " |
| (17) | M-5 | C-6 | 90/10 | LiPF$_6$/PC + EC (2 M) | 2.4 | $7.1 \times 10^{-4}$ | " |
| (18)*$^4$ | M-7 | C-2 | 90/10 | LiBF$_4$/PC (1.5 M) | 2.0 | $6.6 \times 10^{-4}$ | 55 |
| (19) | M-2 + M-5 (1/1) | C-10 | 95/5 | LiCF$_3$SO$_3$/γ-BL (1.2 M) | 2.5 | $5.6 \times 10^{-4}$ | >100 |
| (20) | M-2 + M-12 (2/1) | C-11 | 90/10 | LiCF$_3$SO$_3$/PC + EC (3 M) | 2.0 | $1.0 \times 10^{-3}$ | " |
| (21) | M-13 | C-3 | 95/5 | LiBF$_4$/PC + γ-BL (1.5 M) | 1.9 | $7.7 \times 10^{-4}$ | " |
| (22) | M-4 | C-8 | 95/5 | LiClO$_4$/PC + EC (1.5 M) | 2.5 | $4.5 \times 10^{-4}$ | " |
| (23) | M-6 | C-8 | 92/8 | LiBF$_4$/PC + DEDM (1 M) | 1.8 | $5.2 \times 10^{-4}$ | " |
| (24)*$^4$ | M-10 | C-9 | 95/5 | LiBF$_4$/PC (1.5 M) | 2.0 | $8.4 \times 10^{-4}$ | 70 |
| (e) | E-2 | — | — | LiClO$_4$/PC (1.2 M) | 1.0 | $1.5 \times 10^{-4}$ | 25 |
| (f) | E-2 | — | — | LiClO$_4$/PC (1.2 M) | 2.0 | $5.2 \times 10^{-4}$ | <10 |

In Table 2:
*$^4$Polymerized without using a polymerization initiator.

As is clear from the results shown in Table 2, it can be seen that thin films (13) to (24) in the examples of this invention are remarkably excellent in the ionic conductivity and the film strength as compared to thin films (e) and (f) in the comparative examples.

EXAMPLE 3

Case of using crosslinking agent

In 3 g of PC were dissolved 0.8 g of Monomer M-2 and 0.2 g of Monomer C-1 and then 0.1 g of azobisisobutyronitrile was uniformly dissolved in the solution.

The solution was poured in a Teflon plate and gelled by heating the solution to 125° C. for one hour to provide a thin film. The thin film was immersed in a PC solution (concentration of 1.4M) for one hour and the immersion operation was further repeated once to provide thin film (25) shown in Table 3. By following the aforesaid procedure using the components shown in Table 3, thin films (26) to (36) were further prepared.

COMPARATIVE EXAMPLE 4

Thin films (g) and (h) composed of Polymer (E-3) shown below, low molecular weight PEO, and Li salts described in JP-A-63-135477 were prepared by heat polymerization.

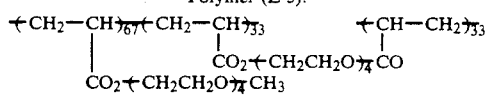

COMPARATIVE EXAMPLE 5

Thin films (i) and (j) composed Polymer (E-4) shown below, PC or tetragraim, Li salts, and high molecular weight PEO described in U.S. Pat. No. 4,830,939 were prepared by radiation polymerization.

Polymer (E-4):

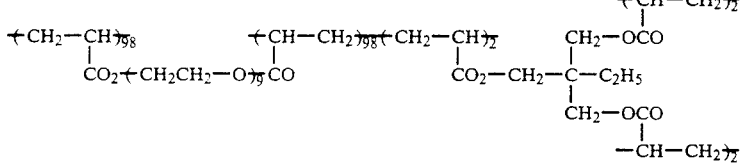

On each of the thin films thus prepared, the ionic conductivity and the film strength were evaluated by the same manners as in Example 1.

The results obtained are shown in Table 3.

comparative examples and are remarkably excellent in the film strength as compared to thin film (i) in the comparative example.

EXAMPLE 4

Case of not using crosslinking agent

In 3 g of PC were dissolved 1 g of benzyl methacrylate and 0.4 g of $LiBF_4$ and then 10 mg of 2,2'-azobis(-methylene isobutyrate) was uniformly dissolved in the solution. A porous polypropylene film (having a diameter of 1.7 cm, a thickness of 200 $\mu$m, a mean pore size of 1.2 $\mu$m, and a porosity of 45%) was impregnated with 100 $\mu$l of the aforesaid solution. Then, the solution was polymerized by heating to 100° C. for one hour under an argon gas atmosphere to provide thin film (1') shown in Table 4 below.

By following the same procedure as above using the components shown in Table 4, thin films (2') to (12') were obtained.

COMPARATIVE EXAMPLE 6

Thin films (a') and (b') composed of PMMA, PC, and Li salts described in JP-B-57-9671 were prepared by the method of heating the PC solution of PMMA.

TABLE 3

| No. | Monomer x of Formula (II) | Monomer y of Formula (III) | x/y (weight ratio) | Metal Ion Salt/Non-protonic Polar Solvent (concentration M) | Nonprotonic Polar Solvent/ Polymer (weight ratio) | Ionic Conductivity (s/cm) | Film Strength (kg/cm$^2$) |
|---|---|---|---|---|---|---|---|
| (25) | M-2 | C-1 | 90/10 | $LiBF_4$/PC (1.4 M) | 2.6 | $7.3 \times 10^{-4}$ | 90 |
| (26) | M-1 | C-10 | 95/5 | $LiBF_4$/PC + 3MeTHF*5 (3/1) (1.5 M) | 2.1 | $9.1 \times 10^{-4}$ | 85 |
| (27) | M-3 | C-1 + C-9 (1/1) | 90/10 | $LiCF_3SO_3$/EC + THF*6 (3/1) (1.2 M) | 1.8 | $1.0 \times 10^{-3}$ | >100 |
| (28) | M-10 | C-8 | 95/5 | $LiCF_3SO_3$/PC + DME*7 (1/1) (2 M) | 2.0 | $1.7 \times 10^{-3}$ | " |
| (29) | M-2 | C-8 | 90/10 | $LiClO_4$/PC + EC (1/1) (2 M) | 2.7 | $7.8 \times 10^{-4}$ | " |
| (30) | M-7 | C-6 | 98/2 | $LiClO_4$/PC + DMF*8 (5/1) (1.2 M) | 2.5 | $1.2 \times 10^{-3}$ | " |
| (31) | M-1 + M-4 (1/1) | C-12 | 95/5 | $LiBF_4$/$\gamma$-BL (1.2 M) | 2.8 | $5.4 \times 10^{-4}$ | 95 |
| (32) | M-2 + M-12 | C-9 | 85/15 | $LiCF_3SO_3$/DME (1.0 M) | 1.6 | $8.9 \times 10^{-4}$ | >100 |
| (33) | M-2 + M-13 | C-9 | 97/3 | $LiBF_4$/PC + DME (1/1) (1.4 M) | 2.0 | $1.8 \times 10^{-3}$ | " |
| (34) | M-1 | C-3 | 90/10 | $LiPF_6$/EC + 3MeTHP*9 (3/1) (2 M) | 2.0 | $7.0 \times 10^{-4}$ | >100 |
| (35) | M-2 | C-5 | 92/8 | $LiCF_3SO_3$/$\gamma$-BL (1.5 M) | 2.0 | $7.4 \times 10^{-4}$ | " |
| (36) | M-11 | C-8 | 97/3 | $LiCLO_4$/sulforan + DME (3/1) (1 M) | 2.3 | $9.1 \times 10^{-4}$ | " |
| (g) | E-3 | — | — | $LiClO_4$/PEO400 (0.8 M) | 0.8 | $7.2 \times 10^{-5}$ | 45 |
| (h) | E-3 | — | — | $LiClO_4$/PEO300 (1 M) | 1.5 | $2.1 \times 10^{-4}$ | 20 |
| (i) | E-4/PEO 500,000 | — | — | $LiCF_3SO_3$/PC (2 M) | 5.0 | $1.0 \times 10^{-3}$ | <10 |
| (j) | E-4/PEO 500,000 | — | — | $LiCF_3SO_3$/tetragraim (2 M) | 5.0 | $2.1 \times 10^{-4}$ | <10 |

*5 3-Methyltetrahydrofuran
*6 Tetrahydrofuran
*7 1,2-Dimethoxyethane
*8 N,N-Dimethylformamide
*9 3-Methyltetrahydropyran As is clear from the results in Table 3, it can be seen that thin films (25) to (36) in the examples of this invention are excellent in the ionic conductivity and the film strength as compared to thin films (g), (h), and (j) in the

COMPARATIVE EXAMPLE 7

Thin films (c') and (d') composed of poly(1-vinyl-1,2-propanediol cyclic carbonate) (E-1) having a mean molecular weight of 10,000, PC, and Li salts described in JP-A-62-22375 by the method of heating the PC solution of the polymer.

Using each of the thin films, a sample composed of Li/thin film/Li was prepared, the impedance thereof was measured at 0.1 to 10 KHz, from the Cole-Cole's plots, the ionic conductivity and the interfacial resistance were determined.

Also, each of the thin films was cut into a disk having a diameter of 1.7 cm, the disk was placed on a stainless steel plate, a stainless plate having the same diameter as that of the disk was placed on the disk, a weight was applied to them from above, and the extruded weight of the thin film was employed as the film strength. The evaluated results are shown in Table 4 below.

TABLE 4

| No. | Polymer x of Formula (I) | Metal Ion Salt/Nonprotonic Polar Solvent (concentration M) | Nonprotonic Polar Solvent/Polymer (weight ratio) | Material | Porous Film Thickness ($\mu$m) | Mean Pore Size ($\mu$m) | Porosity (%) |
|---|---|---|---|---|---|---|---|
| (1') | P-2 | LiBF$_4$/PC (1.3 M) | 2.5 | PP*4 | 140 | 0.80 | 45 |
| (2') | P-2 | LiClO$_4$/$\gamma$-BL (2 M) | 2.0 | " | " | " | " |
| (3') | P-1 | LiBF$_4$/PC + EC*1 (1/1) (2 M) | 1.4 | " | " | " | " |
| (4') | P-3 | LiCF$_3$SO$_3$/DEDM*2 (1 M) | 2.2 | " | 75 | 0.35 | 40 |
| (5') | P-5 | LiPF$_6$/PC + EC (1/1) (2 M) | 1.3 | " | " | " | " |
| (6')*3 | P-7 | LiBF$_4$/PF (1.5 M) | 2.0 | " | " | " | " |
| (7') | P-5 | LiCF$_3$SO$_3$/$\gamma$-BL (1.2 M) | 1.8 | " | 80 | 0.15 | 48 |
| (8') | P-12 | LiCF$_3$SO$_3$/PC + EC (3 M) | 2.0 | " | " | " | " |
| (9') | P-13 | LiBF$_4$/PC + $\gamma$-BL (2/1) (1.5 M) | 1.2 | PE*5 | 155 | 0.75 | 38 |
| (10') | P-4 | LiCLO$_4$/PC + EC (2/1) (1.5 M) | 1.2 | " | " | " | " |
| (11') | P-6 | LiBF$_4$/PC + DEDM (3/1) (1 M) | 1.8 | " | 70 | 0.45 | 36 |
| (12') | P-10 | LiBF$_4$/PC (1.5 M) | 2.0 | " | " | " | " |
| (a') | PMMA | LiClO$_4$/PC (1 M) | 2.5 | PP | 140 | 0.8 | 45 |
| (b') | " | LiBF$_4$/butyl acetate (1 M) | 0.8 | " | " | " | " |
| (c') | (E-1) | LiBPh$_4$/PC (1.5 M) | 2.0 | PP | 140 | 0.8 | 45 |
| (d') | " | " | 1.0 | " | " | " | " |

*1 Ethylene carbonate
*2 Diethylene glycol dimethyl ether
*3 Polymerized without using polymerization initiator
*4 Polypropylene
*5 Polyethylene

TABLE 4'

| No. | Ionic Conductivity (s/cm) | Interfacial Resistance ($\Omega$/cm) | Film Strength (kg/cm$^2$) |
|---|---|---|---|
| (1') | 8.0 × 10$^{-4}$ | 21 | 85 |
| (2') | 7.0 × 10$^{-4}$ | 19 | 80 |
| (3') | 4.9 × 10$^{-4}$ | 20 | >100 |
| (4') | 4.5 × 10$^{-4}$ | 27 | 90 |
| (5') | 7.1 × 10$^{-4}$ | 25 | >100 |
| (6') | 6.9 × 10$^{-4}$ | 24 | 75 |
| (7') | 5.8 × 10$^{-4}$ | 31 | >100 |
| (8') | 1.1 × 10$^{-3}$ | 33 | " |
| (9') | 7.3 × 10$^{-4}$ | 24 | " |
| (10') | 4.9 × 10$^{-4}$ | 19 | " |
| (11') | 8.7 × 10$^{-4}$ | 20 | " |
| (12') | 6.2 × 10$^{-4}$ | 21 | 90 |
| (a') | 7.0 × 10$^{-4}$ | 27 | 25 |
| (b') | 8.5 × 10$^{-5}$ | 38 | 55 |
| (c') | 4.5 × 10$^{-4}$ | 26 | 20 |
| (d') | 1.0 × 10$^{-4}$ | 20 | 50 |

As is clear from the results shown in Table 4, thin films (a') to (d') in the comparative examples each uses a porous film having large pore sizes but since the high molecular compounds used are greatly inferior in film forming property, when the impregnated amount of the nonprotonic polar solvent is increased for increasing the ionic conductivity, the film strength of the thin film is greatly reduced. Thus, in the comparative samples, it is impossible to increase both the ionic conductivity and the film forming property (film strength).

On the other hand, in thin films (1') to (12') in the examples of this invention, in spite of using a porous film having large pore sizes, all the high ionic conductivity, the low interfacial resistance, and the high film forming property can be satisfied by combining with the high molecular compound having the specific structure.

That is, it is clear that the thin films obtained in Example 4 are excellent as compared to the thin films in Comparative Example 6 and 7.

EXAMPLE 5

Case of using crosslinking agent

In 3 g of PC were dissolved 0.9 g of Monomer M-2, 0.1 g of Monomer C-2, and 0.4 g of LiBF$_4$ and then 10 ml of benzoyl peroxide was uniformly dissolved in the solution. Then, a porous polypropylene film (having a diameter of 1.7 cm, a thickness of 200 $\mu$m, a mean pore size of 1.2 $\mu$m, and a porosity of 45%) was impregnated with 100 $\mu$l of the solution and the solution was polymerized by heating to 110° C. for one hour under an argon gas atmosphere to provide thin film (13') shown in Table 5.

Also, by following the same procedure as above using the components shown in Table 5, thin films (14') to (24') were prepared.

COMPARATIVE EXAMPLE 8

Thin films (e') and (f') were prepared by impregnating porous polyethylene films each having a mean pore size of 0.085 $\mu$m and a mean pore size of 0.10 $\mu$m with a solution of LiClO$_4$ dissolved in tetraethylene glycol dimethyl ether as described in U.S. Pat. No. 4,849,311.

COMPARATIVE EXAMPLE 9

Thin films (g') and (h') composed of Polymer (E-2) shown in Comparative Example 3, PC, and the Li salts described in U S. Pat. No. 4,822,701 were prepared.

On each of the thin films thus obtained, the ionic conductivity, the interfacial resistance, and the film forming property (film strength) were evaluated by the same manners as in Example 4.

The results obtained are shown in Table 5, below.

TABLE 5

| No. | Monomer x of Formula (II) | Monomer y of Formula (III) | x/y (weight ratio) | Metal Ion Salt/Nonprotonic Polar Solvent (concentration M) | Nonprotonic Polar Solvent/Polymer (weight ratio) | Material | Porous Film Thickness (μm) | Porous Film Mean Pore Size (μm) | Porous Film Porosity (%) |
|---|---|---|---|---|---|---|---|---|---|
| (13') | M-2 | C-2 | 90/10 | LiBF$_4$/PC (1.3 M) | 2.3 | PP | 80 | 0.15 | 48 |
| (14') | " | C-5 | 95/5 | LiClO$_4$/γ-BL (2 M) | 2.0 | " | " | " | " |
| (15') | M-1 | C-1 | 85/15 | LiBF$_4$/PC + EC (1/1) (2 M) | 2.0 | " | 75 | 0.35 | 40 |
| (16') | M-3 | C-8 | 90/10 | LiCF$_3$SO$_3$/DEDM (1 M) | 2.2 | " | " | " | " |
| (17') | M-5 | C-6 | " | LiPF$_6$/PC + EC (1/1) (2 M) | 2.4 | PE | 155 | 0.75 | 38 |
| (18')*6 | M-7 | C-2 | " | LiBF$_4$/PC (1.5 M) | 2.0 | " | 70 | 0.45 | " |
| (19') | M-2 + M-5 (1/1) | C-10 | 95/5 | LiCF$_3$SO$_3$/γ-BL (1.2 M) | 2.5 | " | " | " | 36 |
| (20') | M-2 + M-12 (2/1) | C-11 | 90/10 | LiCF$_3$SO$_3$/PC + EC (2/1) (3 M) | 2.0 | PP | 140 | 0.8 | 45 |
| (21') | M-13 | C-3 | 95/5 | LiBF$_4$/PC + γ-BL (2/1) (1.5 M) | 1.9 | " | " | " | " |
| (22') | M-4 | C-8 | " | LiClO$_4$/PC + EC (1/1) (1.5 M) | 2.5 | " | 80 | 0.15 | 48 |
| (23') | M-6 | " | 92/8 | LiBF$_4$/PC + DEDM (3/1) (1 M) | 1.8 | " | " | " | " |
| (24')*6 | M-10 | C-9 | 95/5 | LiBF$_4$/PC (1.5 M) | 2.0 | " | 75 | 0.35 | 40 |
| (e') | — | — | — | LiClO$_4$/TEG*7 (1 M) | — | PE | 25 | 0.04 | 42 |
| (f') | — | — | — | LiClO$_4$/TEG*7 (1.5 M) | — | " | 30 | 0.10 | 38 |
| (g') | E-2 | — | — | LiClO$_4$/PC (1.2 M) | 1.0 | — | — | — | — |
| (h') | " | — | — | " | 2.0 | — | — | — | — |

*6 Polymerized without using polymerization initiator
*7 Tetraethylene glycol dimethyl ether

TABLE 5'

| No. | Ionic Conductivity (s/cm) | Interfacial Resistance (Ω/cm) | Film Strength (kg/cm²) |
|---|---|---|---|
| (13') | 8.2 × 10$^{-4}$ | 29 | >100 |
| (14') | 5.8 × 10$^{-4}$ | 34 | " |
| (15') | 7.2 × 10$^{-4}$ | 24 | " |
| (16') | 4.3 × 10$^{-4}$ | 20 | " |
| (17') | 6.7 × 10$^{-4}$ | 18 | 90 |
| (18') | 7.2 × 10$^{-4}$ | 22 | 85 |
| (19') | 4.4 × 10$^{-4}$ | 23 | >100 |
| (20') | 9.5 × 10$^{-4}$ | 19 | 80 |
| (21') | 7.7 × 10$^{-4}$ | 19 | 95 |
| (22') | 5.4 × 10$^{-4}$ | 30 | >100 |
| (23') | 6.2 × 10$^{-4}$ | 31 | " |
| (24') | 8.8 × 10$^{-4}$ | 24 | " |
| (e') | 5.9 × 10$^{-5}$ | 110 | " |
| (f') | 7.2 × 10$^{-5}$ | 58 | " |
| (g') | 1.5 × 10$^{-4}$ | 30 | 25 |
| (h') | 5.2 × 10$^{-4}$ | 28 | <10 |

As is clear from the results shown in Table 5', in thin films (g') and (h') in the comparative example, the polymeric film is impregnated with a large amount of the nonprotonic polar solvent for increasing the ionic conductivity, whereby the film strength is greatly reduced. However, in thin films (13') to (24') in the examples of this invention, all the high ionic conductivity, the low interfacial resistance, and the high film forming property can be satisfied, as well as Example 4. On the other hand, in thin films (e') and (f') in the comparative example, since a porous film having small pore sizes is used, the film strength is high but the interfacial resistance with Li is very large and also the ionic conductivity is low.

That is, the thin films in Example 5 are clearly excellent in comparison to the thin films in Comparative Examples 8 and 9.

EXAMPLE 6

Case of using crosslinking agent

In 3 g of PC were dissolved 0.8 g of Monomer-2 and 0.2 g of Monomer C-1 and then 0.1 g of azobisisobutyronitrile was uniformly dissolved in the solution.

Then, a porous polypropylene film (diameter of 1.7 cm, a thickness of 200 μm, a mean pore size of 1.2 μm, and a porosity of 45%) was impregnated with 100 μl of the aforesaid solution and the solution was polymerized by heating to 110° C. for one hour under an argon gas atmosphere to provide a porous film filled with a crosslinked high molecular matrix. The thin film was immersed in a PC solution of LiBF$_4$ (concentration of 1.4M) for one hour and further the immersion operation was further repeated once to provide thin film (25') shown in Table 6.

By following the same procedure by the method of impregnating with the nonprotonic polar solvent after reaction by heating, thin films (26') to (36') were prepared.

COMPARATIVE EXAMPLE 10

Thin films (i') and (j') composed of Polymer (E-3) shown in Comparative Example 4, low molecular weight PEO, and Li salts described in JP-A-63-135477 were prepared by heat polymerization.

COMPARATIVE EXAMPLE 11

Thin films (k') and (l') composed of Polymer (E-4) shown in Comparative Example 5, PC or tetragram, Li salts and high molecular weight PEO described in U.S. Pat. No. 4,830,939 were prepared.

On each of the thin films thus obtained, the ionic conductivity, the interfacial resistance, and the film forming property (film strength) were evaluated as in Example 4.

The results are shown in Table 6'.

TABLE 6

| No. | Monomer x of Formula (II) | Monomer y of Formula (III) | x/y (weight ratio) | Metal Ion Salt/Nonprotonic Polar Solvent (concentration M) | Nonprotonic Polar Solvent/ Polymer (weight ratio) | Porous Film Material | Thickness (μm) | Mean Pore Size (μm) | Porosity (%) |
|---|---|---|---|---|---|---|---|---|---|
| (25') | M-2 | C-1 | 90/10 | LiBF$_4$PC (1.4 M) | 2.6 | PP | 140 | 0.8 | 45 |
| (26') | M-1 | C-10 | 95/5 | LiBF$_4$/PC + 3MeTHF*[8] (3/1) (1.5 M) | 2.1 | " | " | " | " |
| (27') | M-3 | C-1 + C-9 (1/1) | 90/10 | LiCF$_3$SO$_3$/EC + THF*[9] (1.2 M) | 1.8 | " | 80 | 0.15 | 48 |
| (28') | M-10 | C-8 | 95/5 | LiCF$_3$SO$_3$/PC + DME*[10] (2 M) | 2.0 | " | " | " | " |
| (29') | M-2 | " | 90/10 | LiClO$_4$/PC + EC (1/1) (2 M) | 2.7 | " | 75 | 0.35 | 40 |
| (30') | M-7 | C-6 | 98/2 | LiClO$_4$/PC + DMF*[11] (5/1) (1.2 M) | 2.5 | " | " | " | " |
| (31') | M-1 + M-4 (1/1) | C-12 | 95/5 | LiBF$_4$/γ-BL (1.2 M) | 2.8 | PE | 155 | 0.75 | 38 |
| (32') | M-2 + M-12 (1/1) | C-9 | 85/15 | LiCF$_3$SO$_3$/DME (1.0 M) | 1.6 | " | " | " | " |
| (33') | M-2 + M-13 (3/1) | " | 97/3 | LiBF$_4$/PC + DME (2/1) (1.4 M) | 2.0 | " | 70 | 0.45 | 36 |
| (34') | M-1 | C-3 | 90/10 | LiPF$_6$/EC + 3MeTHP*[12] (3/1) (2 M) | 2.0 | " | " | " | " |
| (35') | M-2 | C-5 | 92/8 | LiCF$_3$SO$_3$/γ-BL (1.5 M) | 2.0 | PE | 75 | 0.35 | 40 |
| (36') | M-11 | C-8 | 97/3 | LiClO$_3$/sulforan + DME (3/1) (1 M) | 2.3 | " | " | " | " |
| (i') | E-3 | — | — | LiClO$_4$/PEO 400 (0.8 M) | 0.8 | — | — | — | — |
| (j') | " | — | — | LiClO$_4$/PEO 300 (1 M) | 1.5 | — | — | — | — |
| (k') | E-4/PEO | — | — | LiCF$_3$SO$_3$/PC (2 M) | 3.0 | — | — | — | — |
| (l') | " | — | — | LiCF$_3$SO$_3$/tetragraim (2 M) | 3.0 | — | — | — | — |

*[8]3-Methyltetrahydrofuran
*[9]Tetrahydrofuran
*[10]Dimethoxyethane
*[11]N,N-Dimethylforamide
*[12]Tetrahydropyran

TABLE 6'

| No. | Ionic Conductivity (s/cm) | Interfacial Resistance (Ω/cm) | Film Strength (kg/cm$^2$) |
|---|---|---|---|
| (25') | 7.5 × 10$^{-4}$ | 19 | 85 |
| (26') | 9.5 × 10$^{-4}$ | 17 | >100 |
| (27') | 1.1 × 10$^{-3}$ | 28 | " |
| (28') | 1.5 × 10$^{-3}$ | 29 | " |
| (29') | 8.7 × 10$^{-4}$ | 25 | " |
| (30') | 1.2 × 10$^{-3}$ | 20 | " |
| (31') | 5.4 × 10$^{-4}$ | 23 | 80 |
| (32') | 8.9 × 10$^{-4}$ | 19 | 95 |
| (33') | 1.6 × 10$^{-3}$ | 22 | >100 |
| (34') | 7.0 × 10$^{-4}$ | 20 | " |
| (35') | 7.4 × 10$^{-4}$ | 21 | " |
| (36') | 9.7 × 10$^{-4}$ | 18 | " |
| (i') | 7.2 × 10$^{-5}$ | 48 | 45 |
| (j') | 1.1 × 10$^{-4}$ | 40 | 20 |
| (k') | 1.0 × 10$^{-3}$ | 22 | <10 |
| (l') | 2.1 × 10$^{-4}$ | 35 | " |

As is clear from the results shown in Table 6', it can be seen that thin layers (25') to (36') in Example 6 of this invention satisfied all the properties of the high ionic conductivity, the low interfacial resistance, and the high film forming property (film strength) as in Example 4. On the other hand, in thin films (i') and (j') in the comparative example, the ionic conductivity is low since the low molecular weight polyethylene glycol is used as the ionic conductor and also the film strength is greatly reduced if a large amount of the ionic conductor is impregnated for increasing the ionic conductivity.

Furthermore, in thin films (k') and (l') in the comparative example, when a large amount of the nonprotonic polar solvent is impregnated for increasing the ionic conductivity, the film strength is greatly reduced.

Thus, it can be clearly seen that the thin films in Example 6 are excellent as compared with samples in Comparative Examples 10 and 11.

As described above, the thin films in Examples 4 to 6 are excellent in either or all of the ionic conductivity, the interfacial resistance, and the film thickness as compared to the thin films in Comparative Examples 6 to 11.

Then, examples of the cases of applying each of the organic solid electrolytes of this invention to a Li secondary battery are explained.

EXAMPLE 7

Using each of the organic solid electrolytes prepared in Examples 1 to 3 (or in Examples 4 to 6), a battery (cell) shown in FIG. 1 was prepared. In this case, as the positive electrode active material, a positive electrode pellet (having a diameter of 15 mm and a capacity of 20 mAH) composed of V$_6$O$_{13}$ described in *Denki Kagaku (Electrochemistry)*, Vol. 54, 691 (1986) was used, as a negative electrode active material, a metal lithium (having a diameter of 15 mm and a capacity of 40 mAH) was used, and organic solid electrode (1) (having a diameter of 17 mm) prepared in Example 1 was used between the positive electrode pellet and the negative electrode pellet. On the lithium battery, charging and discharging tests were carried out in the ranges of an electric current density of 1.1 mA/cm$^2$ and a voltage of 3.1 V to 1.7 V. The results are shown as Curve (a) in FIG. 2 as the change of the charging and discharging capacity.

By following the same procedure as above using the components shown in Table 7, lithium batteries (b) to (g) were prepared and the charging and discharging tests were carried out.

Nos. (a) to (d) shown in Table 7 correspond to curves (a) to (d) shown in FIG. 2 and Nos. (e) to (g) shown in Table 7 correspond to curves (e) to (g) of FIG. 3.

COMPARATIVE EXAMPLE 12

Using each of the solid electrolytes prepared in Comparative Examples 1 and 2 (or Comparative Examples 6 and 7), each of lithium batteries (p) and (q) shown in Table 7 were prepared by the same manner as in Example 7 and the charging and discharging tests were carried out on each battery. The test results of using the solid electrolytes prepared in Comparative Examples 1 and 2 are shown as curves (p) and (q) in FIG. 2 and the results of using the solid electrolytes in Comparative Examples 1 and 2 are shown as curves (p) and (q) in FIG. 3.

Figure 2:
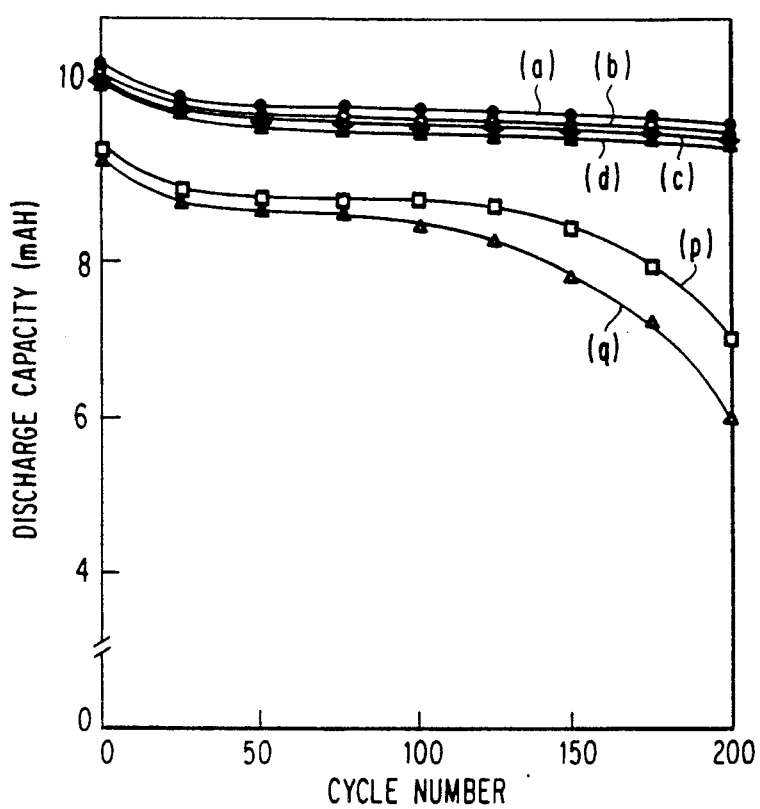
FIG. 2 and FIG. 3 are graphs showing the results of the changes of the discharging capacities by the charging and discharging tests in Example 7 and Comparative Example 12.
Figure 3:
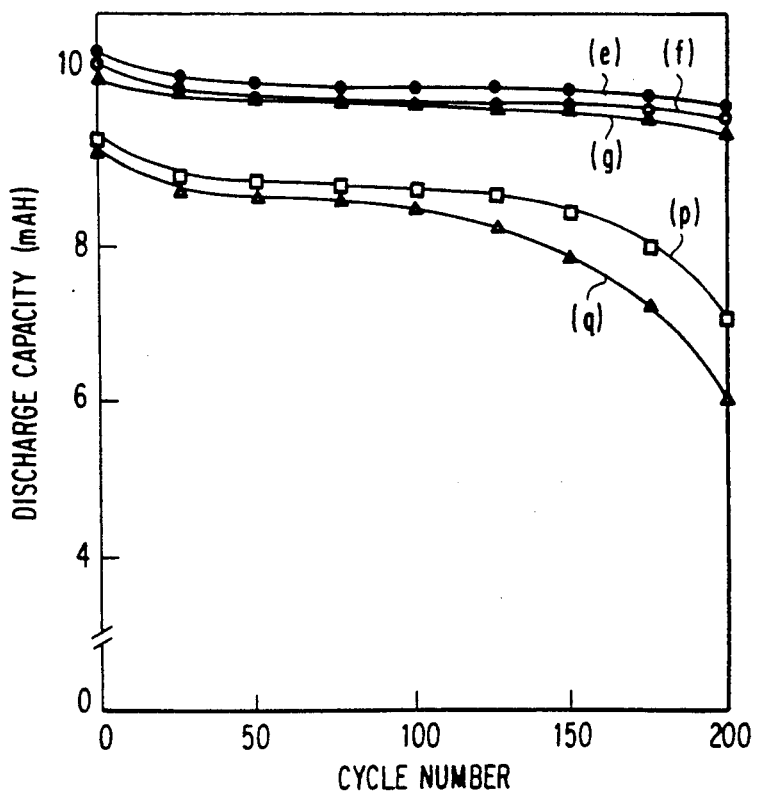

As is clear from the results shown in FIG. 2 and FIG. 3, it can be seen that the batteries using the organic solid electrolytes of this invention are excellent in the change of discharging capacity as compared to the batteries using the solid electrolytes in Comparative Examples 1 and 2 (or the solid electrodes in Comparative Examples 6 and 7).

(The same results were obtained using the organic solid electrolytes prepared in Examples 4 to 6 and Comparative Examples 6 and 7.)

ample 1 (or Example 4) was used between the positive electrode pellet and the negative electrode pellet.

On the Tan-3 type (size AA) lithium battery, a charging and discharging test was carried out in the range of from 3.1 V to 1.7 V at a current density of 1.1 mA/cm$^2$. The result is shown in curve (h) of FIG. 5 as the change of the charging and discharging capacity.

By following the same procedure as above using the components shown in Table 8, lithium batteries (i) to (n) shown in Table 8 were prepared and the charging and discharging test was carried out on each battery.

The test results were as follows. That is, Nos. (h) to (k) in Table 8 correspond to curves (h) to (k) shown in FIG. 6 and Nos. (l) to (n) shown in Table 7 correspond to curves (l) to (n) shown in FIG. 6.

COMPARATIVE EXAMPLE 13

Using solid electrolytes prepared in Comparative Examples 3 and 4 (or Comparative Examples 9 and 10), lithium batteries (r) and (s) shown in Table 8 were prepared by the same manner as in Example 8 and the charging and discharging test was carried out under the same condition described in Table 8. The test results

TABLE 7

| No. | Positive Electrode Active Material (15 mmφ, capacity, 20 mAH) | Negative Electrode Active Material (15 mmφ, capacity, 40 mAH) | Electrolyte (17 mmφ) | Current Density (mA/cm$^2$) | Changing and Discharging Depth |
| --- | --- | --- | --- | --- | --- |
| (a) | Pellet composed of V$_6$O$_{13}$*$^1$ | Metal Lithium | (1) of Example 1 | 1.1 | 3.1V–1.7V |
| (b) | Pellet composed of γ-β-MnO$_2$ + Li$_2$MnO$_3$*$^2$ | Metal Lithium | (25) of Example 3 | " | 3.3V–1.9V |
| (c) | Pellet composed of polyaniline*$^3$ | Metal Lithium | (13) of Example 2 | " | 3.0V–2.0V |
| (d) | Pellet composed of polypyrrole*$^4$ | Li—Al Alloy | (20) of Example 2 | " | 3.3V–1.7V |
| (e) | Pellet composed of amorphous V$_2$O$_5$*$^5$ | " | (28) of Example 3 | " | 3.2V–1.8V |
| (f) | Pellet composed of polyaniline*$^6$ | " | (33) of Example 3 | " | 3.0V–2.0V |
| (g) | Pellet composed of polypyrrole*$^7$ | Metal Lithium | (8) of Example 1 | " | 3.3V–1.7V |
| (p) | Pellet composed of V$_6$O$_{13}$*$^1$ | Metal Lithium | (b) of Comparative Example 1 | " | 3.1V–1.7V |
| (q) | Pellet composed of polyaniline*$^3$ | Metal Lithium | (d) of Comparative Example 2 | " | 3.0V–2.0V |

In Table 7:
*$^1$Described in Denki Kagaku (Electrochemistry), Vol. 54, 691 (1986)
*$^2$Described in U.S. Pat. No. 4,758,484
*$^3$Described in JP-A-63-463233
*$^4$Described in JP-A-62-143373
*$^5$Described in JP-A-61-200667
*$^6$Described in JP-A-2-219823
*$^7$Described in JP-A-2-255770

EXAMPLE 8

Figure 4:
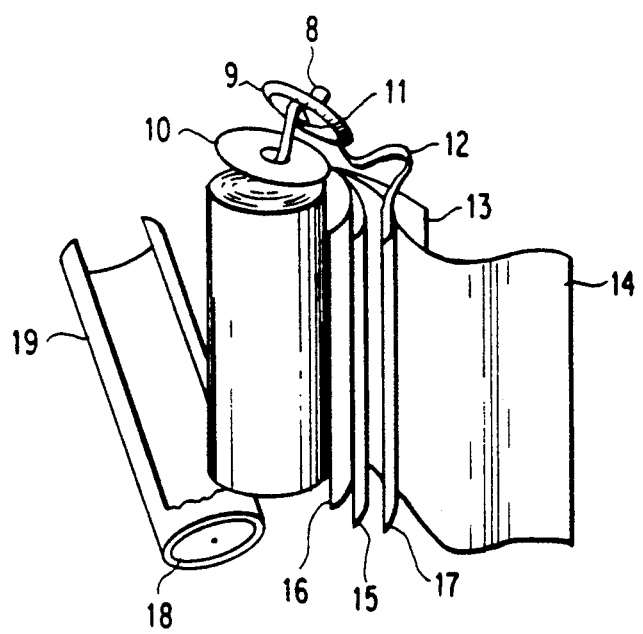
FIG. 4 is a view showing the structure of the galvanic cell prepared in Example 8.

Each of the Tan-3 type (size AA) batteries shown in FIG. 4 were prepared using each of the organic solid electrolytes prepared in Example 1 (or Example 4). As the positive active material, the positive electrode material (0.75 AH) composed of V$_6$O$_{13}$ described in *Denki Kagaku* (*Electrochemistry*), Vol. 54, 691 (1986) was used, as the negative active material, metal lithium (1.5 AH) was used, organic solid electrolyte (9) prepared in Exwere curves (r) and (s) in FIG. 5 and curves (r) and (s) in FIG. 6, respectively.

Figure 5:
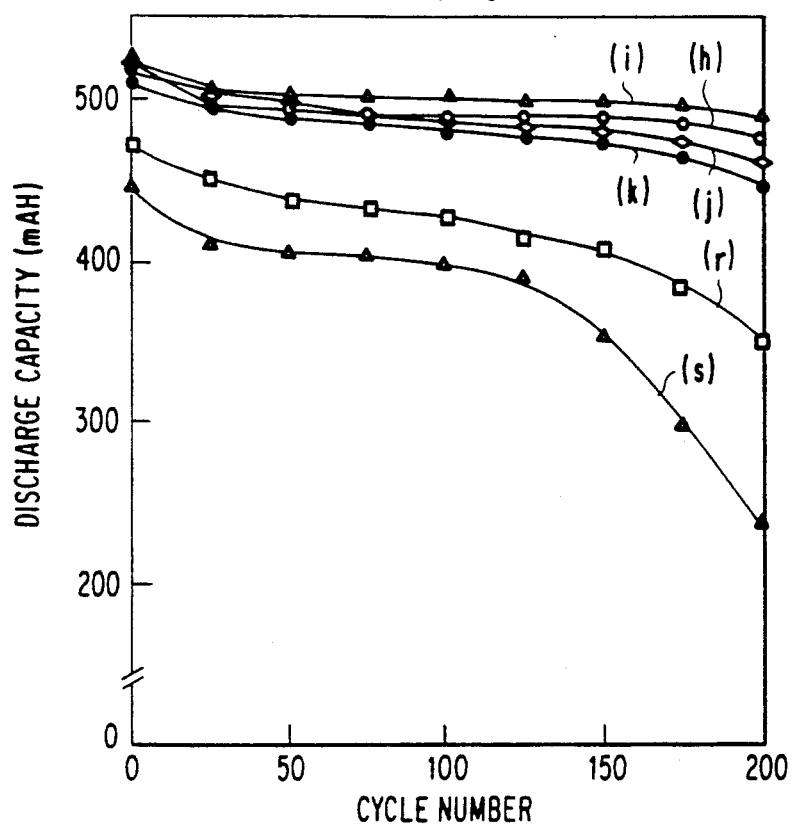
FIG. 5 and FIG. 6 are graphs showing the results of the changes of the discharging capacities by the charging and discharging tests in Example 8 and Comparative Example 13.
Figure 6:
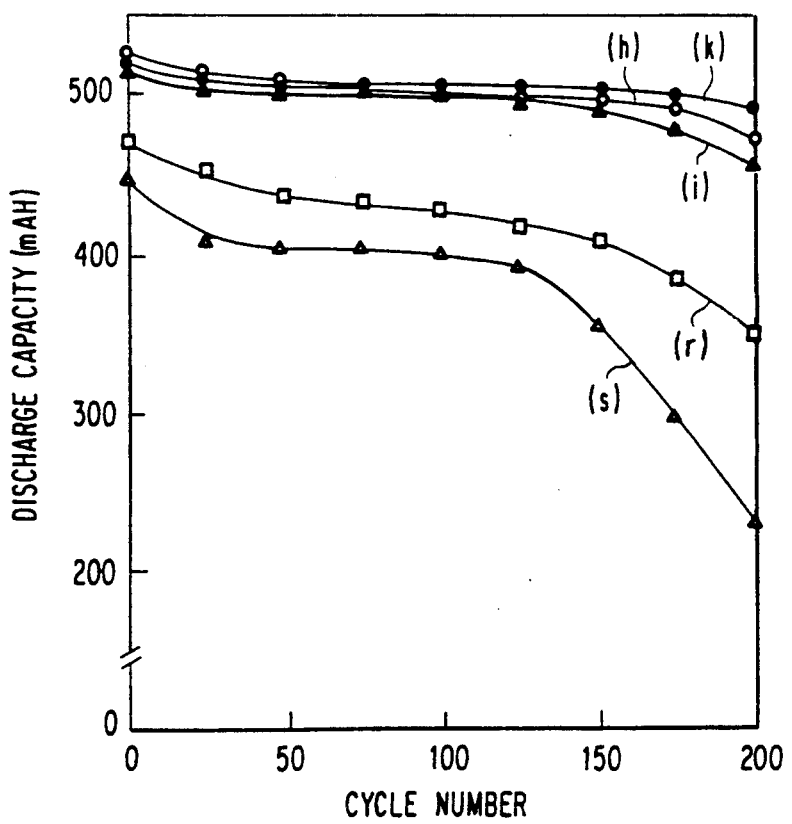

As is clear from FIG. 5 and FIG. 6, it can be seen that the batteries using the organic solid electrolytes of this invention are excellent in the change of charging capacity as compared to the batteries using the solid electrolytes in Comparative Examples 3 and 4 (or Comparative Examples 9 and 10).

(The same results were obtained using the organic solid electrolytes prepared in Example 4 and Comparative Examples 9 and 10.)

TABLE 8

| No. | Positive Electrode Active Material (capacity, 0.75 AH) | Negative Electrode Active Material (capacity, 1.5 AH) | Electrolyte (17 mmφ) | Current Density (mA/cm$^2$) | Changing and Discharging Depth |
| --- | --- | --- | --- | --- | --- |
| (h) | Positive electrode material | Li—Al Alloy | (2) of | 1.1 | 3.1V–1.7V |

TABLE 8-continued

| No. | Positive Electrode Active Material (capacity, 0.75 AH) | Negative Electrode Active Material (capacity, 1.5 AH) | Electrolyte (17 mmφ) | Current Density (mA/cm$^2$) | Changing and Discharging Depth |
|---|---|---|---|---|---|
| | composed V$_6$O$_{13}$*$^1$ | | Example 1 | | |
| (i) | Positive electorde material composed of γ-β-MnO$_2$ + Li$_2$MnO$_3$*$^2$ | " | (26) of Example 3 | " | 3.3V–1.9V |
| (j) | Positive electrode material composed of amorphous V$_2$O$_5$*$^3$ | Metal Lithium | (7) of Example 1 | " | 3.2V –1.8V |
| (k) | Positive electrode material composed of MoS$_2$*$^4$ | Metal Lithium | (15) of Example 2 | " | 2.4V–1.1V |
| (l) | Positive electrode material composed of TiS$_2$*$^5$ | Metal Lithium | (29) of Example 3 | " | 2.2V–1.5V |
| (m) | Positive electrode material composed of polyaniline*$^6$ | Li—Al Alloy | (31) of Example 3 | " | 3.0V–2.0V |
| (n) | Positive electrode material composed of polypyrrole*$^7$ | Metal Lithium | (23) of Example 2 | " | 3.3V–1.7V |
| (r) | Positive electrode material composed of V$_6$O$_{13}$*$^1$ | Metal Lithium | (e) of Comparative Example 3 | " | 3.1V–1.7V |
| (s) | Positive electrode material composed of γ-β-MnO$_2$ + Li$_2$MnO$_2$*$^2$ | Metal Lithium | (g) of Comparative Example 4 | 1.1 | 3.3V–1.9V |

In Table 8:
*$^1$Described in Denki Kagaku (Electrochemistry), Vol. 54, 691 (1986)
*$^2$Described in U.S. Pat. No. 4,758,484
*$^3$Described in JP-A-61-200667
*$^4$Described in JP-A-61-64083
*$^5$Described in JP-A-62-222578
*$^6$Described in JP-A-2-219823
*$^7$Described in JP-A-2-255770

As described above, according to this invention, an organic solid electrolyte having an excellent ionic conductivity, showing a good film forming property, and not causing liquid extrusion can be obtained.

Since the organic solid electrolyte of this invention uses a porous film having large pore sizes and a high molecular compound having an aromatic ring at the side chain, the film strength is very strong and even when the porous film is impregnated with a large amount of a nonprotonic polar solvent, the film strength is above a practical level. Also, since the pore sizes are large, the interfacial resistance can be sufficiently reduced.

That is, according to this invention, an organic solid electrolyte having a performance capable of satisfying all the ionic conductivity, the film forming property, and the interfacial resistance can be provided.

While the invention has been described in detail and with reference to specific embodiments thereof, it will be apparent to one skilled in the art that various changes and modifications can be made therein without departing from the spirit and scope thereof.

What is claimed is:

1. An organic solid electrolyte comprising a high molecular compound having a recurring unit represented by following formula (I), a nonprotonic polar solvent, and a salt of a metal ion belonging to group Ia or group IIa of the Periodic Table:

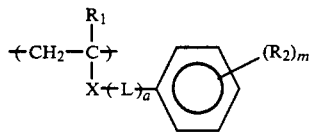
(I)

wherein R$_1$ represents a hydrogen atom, a lower alkyl group, a cyano group, or a chlorine atom; R$_2$ represents a lower alkyl group, an alkenyl group, an aryl group, or an aralkyl group; X represents —CO$_2$—,

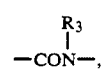

—OCO—, or —O—, (wherein R$_3$ represents a hydrogen atom or a lower alkyl group); L represents an alkylene group; a represents 0 or 1; and m represents an integer of from 0 to 5.

2. The organic solid electrolyte of claim 1, wherein the organic solid electrolyte is formed in a thin film form.

3. An organic solid electrolyte comprising a high molecular matrix composed of a monomer represented by the following formula (II) and a monomer represented by the following formula (III), a nonprotonic polar solvent, and a salt of a metal ion belonging to group Ia or group IIa of the Periodic Table:

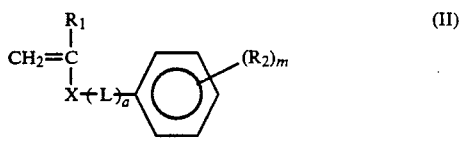
(II)

wherein R$_1$ represents a hydrogen atom, a lower alkyl group, a cyano group, or a chlorine atom; R$_2$ represents a lower alkyl group, an alkenyl group, an aryl, group, or an aralkyl group; X represents —CO$_2$—, $$\begin{array}{c} R_3 \\ | \\ -CON-, \end{array}$$

—OCO—, or —O— (wherein R$_3$ represents a hydrogen atom or a lower alkyl group); L represents an alkylene group; a represents 0 or 1; and m represents an integer of from 0 to 5;

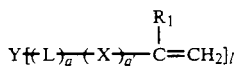 (III)

wherein Y represents an l-valent atomic group composed of carbon or carbon and hydrogen; a' represents 0 or 1; l represents an integer of at least 2; and $R_1$, L, X, and a are the same as in formula (II).

4. The organic solid electrolyte of claim 3, wherein the organic solid electrolyte is formed in a thin film form.

5. The organic solid electrolyte of claim 2 or 4, wherein the thin film is formed by a heating method.

6. The organic solid electrolyte of claim 1 or 3, wherein the organic solid electrolyte is filled in a porous film having a mean pore size of at least 0.15 μm to form a thin film.

7. The organic solid electrolyte of claim 6, wherein the porous film is composed of polyolefin.

8. The organic solid electrolyte of claim 6 or 7, wherein the thin film is formed by a heating method.

* * * * *